Mar. 3, 1925.　　　　　　　　　　　　　　　　1,528,058
B. D. HOBSON
DEVICE FOR EXTRICATING MUD STALLED VEHICLES
Filed Jan. 11, 1924
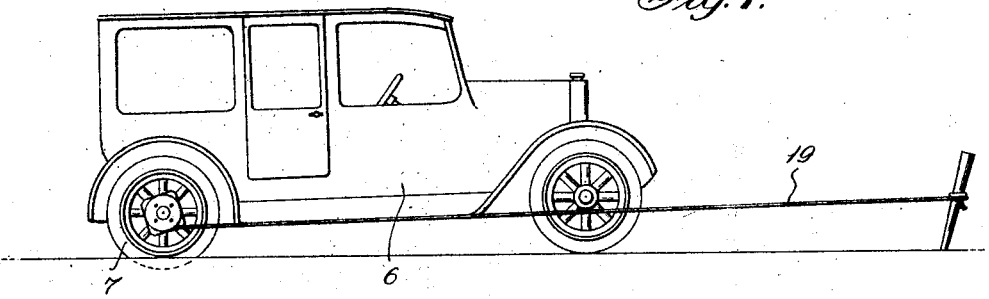
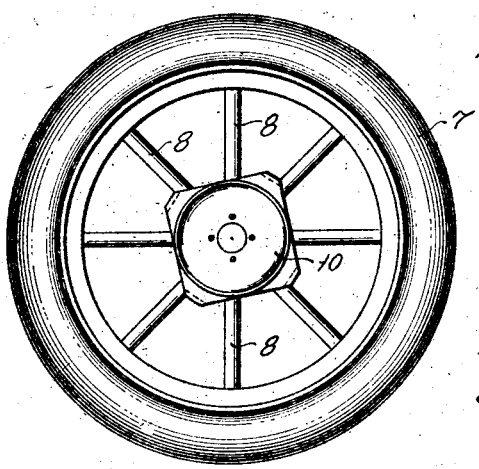
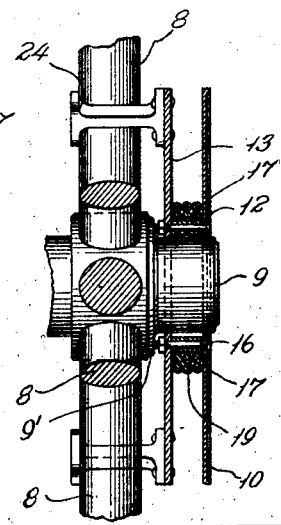
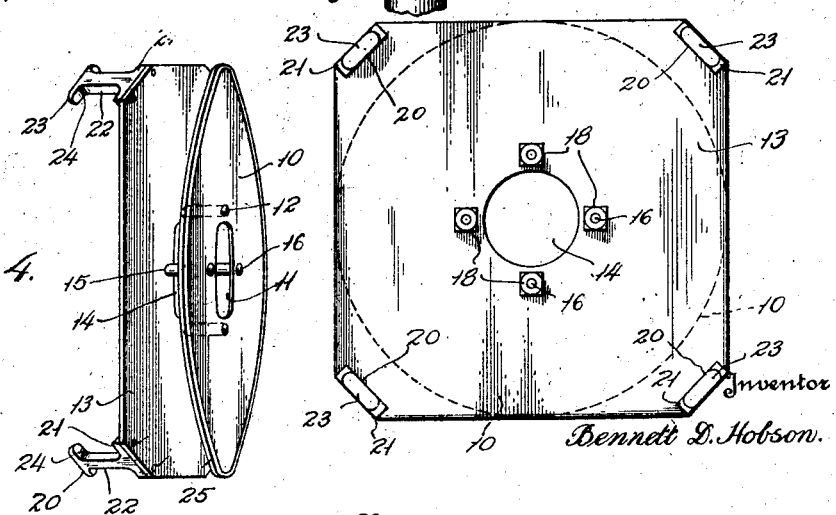
Inventor
Bennett D. Hobson.
By Frank H. Borden
Attorney Patented Mar. 3, 1925.

1,528,058

UNITED STATES PATENT OFFICE.

BENNETT D. HOBSON, OF RICHMOND, VIRGINIA.

DEVICE FOR EXTRICATING MUD-STALLED VEHICLES.

Application filed January 11, 1924. Serial No. 685,636.

*To all whom it may concern:*

Be it known that I, BENNETT D. HOBSON, citizen of the United States, residing at Richmond, in the county of Henrico and State of Virginia, have invented certain new and useful Improvements in Devices for Extricating Mud-Stalled Vehicles, of which the following is a specification.

My invention relates to devices for extricating mud stalled vehicles, and more particularly to the means for attaching such devices to vehicle power wheels.

There has arisen the necessity for a drum or reel which may be properly and securely fastened to a wheel without the display of manual dexterity, and which may be applied and detached instantly as desired, but which will be securely held against motion relative to the wheel when a strain is transmitted to the cable.

It is therefore an object of my invention to provide such a device which has no moving parts, which may be easily and instantly attached and detached, and which when in position will be held immovable with respect to the wheel, and further, which may be applied to either the right or left wheel, and upon which the cable may be wound in either direction and power applied to pull the vehicle either to the front or to the rear without affecting in any way the proper functioning of the drum or reel.

In carrying out my invention, I provide in the preferred form, a pair of plates having central openings into which the hub of a wheel may project, a plurality of spacing collars between the plates to maintain them in proper position to form a drum or reel, and upon the wheel engaging side of the reel, a plurality of I shaped lugs radially arranged and shaped to enter between the spokes of a wheel and adapted to engage the spokes and hold the drum in position upon a very slight relative movement of the drum and the wheel in either direction.

In the accompanying drawings:

Figure 1, is a side elevation of a motor driven vehicle with my invention in an operative position on a wheel, Figure 2, is a side elevation of a wheel with the device in position and engaging the spokes of the wheel, Figure 3, is a vertical section through a portion of a wheel and through the drum or reel showing the manner in which the locking lugs engage the spokes, Figure 4, is a perspective view of the drum or reel showing its simple construction and the location of the integral locking lugs, and Figure 5, is a side elevation of the drum or reel from the wheel engaging side.

The conventional automobile 6 has a power wheel 7, provided with the customary spokes 8. At the center of the wheel a hub 9 extends axially.

The drum or reel of my invention comprises an outer, preferably annular plate 10 provided at the center with an opening 11 into which the hub of the wheel may extend, and radially of the opening 11 is drilled with a plurality of holes 12. An inner plate 13, which for convenience in manufacture may be square and of the same diameter as the outer plate 10 so that the corners or angles extend beyond the outer plate as shown. This inner or secondary plate is provided with a hub receiving opening 14, and is also drilled with a plurality of small holes 15 in registry with the holes 12 in the outer plate. Bolts 16 pass through the holes 12 and 15 to rigidly hold the plates together, and collars or tubes 17 surround the bolts and engage the inner faces of the two plates to hold them properly spaced. The bolts are drawn tight and held firmly by the nuts 18. Thus a rigid drum is provided in which the plates form the flanges of the drum, and the spacing collars and the bolts form the hub about which the cable 19 is wound. The hub receiving openings 11 and 14 are in registry and are of such size as to embrace the hub 9 when the drum is firmly placed upon the wheel. In practice I have found that the ends of the bolts 16 and the nuts 18 carried thereby may be effectively used as a stop to limit the inward movement of the drum and to correctly center and locate the drum in parallelism with the wheel, by abutting the hub plate 9' of the wheel. It is very important that the drum should be in the same plane, or in a parallel plane with that of the wheel so that the stresses created by turning the wheel will be evenly distributed, and so that the cable 19 will be evenly wound.

The locking device forming an important part of my invention, comprises a plurality, preferably four, of I-shaped locking lugs 20 rigidly mounted upon the inner or secondary plate 13. Each lug comprises a comparatively large base 21, a perpendicular shaft or shank 22, and a head 23 slightly smaller than the base, which merges with the shank 22 on a curve at each side 24 of such proportions as to snugly engage a side of a spoke 8.

The effective locking portion of each lug is the T formed by the shank 22 and head 23, and in practice I have found that the best way to connect such a T lug to the plates is by means of the integral enlarged base 21 through which rivets 25 are driven into the inner plate 13. To insure that the locking lugs are arranged with their locking faces in such plane as to engage the radially disposed spokes 8 with the full faces I have found it advisable to cut off the square corners of the inner plate as at 26 and to have the base of the lug flush with this edge and perpendicular with the radius of the opening 14 when they are riveted in position.

In operation the drum is pushed axially against the wheel with the T heads of the locking lugs just between a pair of spokes until the stop formed by the bolts 16 is reached. The drum may then be given a slight turn, of perhaps only 5° when the T heads will have been moved to abut the spokes and to rigidly lock the drum to the wheel, as the arrangement is such that the heads 23 of the lugs are just clear of the spokes on their inner sides, when the stop is reached.

The cable 19 may be affixed to the drum in any preferred manner as by means of an opening in one of the plates (not shown), or by a hooked end engaging one of the hub forming spacing collars, (not shown). It is obvious that winding up the cable by turning the power wheel will extricate the vehicle from its impediment. It is also obvious that the wheel may be turned in either direction to accomplish the desired result, or the drum may be applied to either wheel with equally satisfactory results.

It will be apparent further that I have provided a drum and locking lugs of very simple construction, that have no moving parts, that are rigid and positive in action, and which may be stored in but little space.

I claim as my invention:

1. As an article of manufacture a reel attachable to a power wheel of a vehicle, and integral T-shaped lugs carried thereby adapted to enter axially between the spokes of such wheel and lock the reel in position by a turn of the drum or the wheel in either direction.

2. As an article of manufacture a pair of spaced plates means for maintaining them in spaced relation the whole forming a reel or drum, and a plurality of I-shaped lugs mounted upon one of the plates in position to enter between the spokes of a wheel and to engage with spokes if turned in either direction.

3. The combination with a drum or reel having a stop for engagement with a portion of a wheel, on one side of the spokes thereof, and integral immovable means carried by the reel insertable axially between the spokes until the stop is reached and adapted to engage the spokes on the sides for movement by the wheel and, toward the opposite side thereof from the stop for locking the drum to the wheel, upon rotation of the drum in either direction.

4. As an article of manufacture an inner and an outer plate, each plate having central registering openings, bolts and collars holding the plates in spaced relation and forming the hub of a drum, locking lugs immovably mounted on the inner plate radially disposed with relation to the opening in the plate, each lug formed of a base, a shank and a head, the shank and head forming a T-shaped locking element, the locking lugs so arranged as to pass axially between the spokes of a wheel and adapted to lock the drum in position by a turn of the drum or wheel in either direction.

5. As an article of manufacture an inner and an outer plate, each plate having openings centrally arranged and in registry to receive the hub of a wheel, spacing means for holding the plates in proper spaced relation to form a drum, the spacing means forming a hub for the drum, projections on one face of the inner plate adapted to engage or abut a portion of a wheel to limit the axial movement of the drum toward the wheel in one direction, and locking lugs carried by the inner plate the heads of which are of T shape adapted to enter between the spokes of a wheel when the drum is moved axially thereon, and adapted to engage spokes of such wheel in either direction upon relative rotative movement of such wheel and the drum to limit the axial movement of the drum in the other direction.

In testimony whereof I affix my signature.

BENNETT D. HOBSON.